US011938610B2

(12) United States Patent
Öberg et al.

(10) Patent No.: US 11,938,610 B2
(45) Date of Patent: Mar. 26, 2024

(54) HANDHELD POWER TOOL

(71) Applicant: ATLAS COPCO INDUSTRIAL TECHNIQUE AB, Stockholm (SE)

(72) Inventors: Hans Niklas Öberg, Nacka (SE); Ola Petter Nyström, Hägersten (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 163 days.

(21) Appl. No.: 17/606,016

(22) PCT Filed: Apr. 23, 2020

(86) PCT No.: PCT/EP2020/061290

§ 371 (c)(1),
(2) Date: Oct. 22, 2021

(87) PCT Pub. No.: WO2020/216822

PCT Pub. Date: Oct. 29, 2020

(65) Prior Publication Data

US 2022/0193883 A1 Jun. 23, 2022

(30) Foreign Application Priority Data

Apr. 26, 2019 (SE) .................................... 1930138-1

(51) Int. Cl.
*B25F 5/02* (2006.01)

(52) U.S. Cl.
CPC ..................................... *B25F 5/02* (2013.01)

(58) Field of Classification Search
CPC ......................................................... B25F 5/02
See application file for complete search history.

(56) References Cited

U.S. PATENT DOCUMENTS 2,263,136 A * 11/1941 Knouse ..................... B27B 9/00 30/340
3,131,277 A * 4/1964 Brenzen ................ B27B 17/083 200/522

(Continued)

FOREIGN PATENT DOCUMENTS

DE 102017222869 A1 6/2018
EP 0142650 A2 5/1985

(Continued)

OTHER PUBLICATIONS

International Preliminary Report on Patentability (IPRP) dated Mar. 19, 2021 issued in International Application No. PCT/EP2020/061290.

(Continued)

*Primary Examiner* — Anna K Kinsaul
*Assistant Examiner* — Lucas E. A. Palmer
(74) *Attorney, Agent, or Firm* — Holtz, Holtz & Volek PC

(57) ABSTRACT

A handheld power tool includes a housing in which a motor coupled to an outgoing axle defining an axial direction is arranged, a front gear unit at a front end thereof, a first handle portion and a second supporting handle structure arranged at the front end of the housing and extending in a direction parallel to the axial direction in order to allow a user to support the tool at the front gear, and a first switch and a second switch configured to control a supply of energy to the motor. The handheld power tool is configured to require the user of the power tool to simultaneously operate the first switch and the second switch in order for energy to be supplied to the motor, and the second switch is arranged at the second supporting handle structure.

14 Claims, 2 Drawing Sheets

(56) References Cited

U.S. PATENT DOCUMENTS 3,793,727 A * 2/1974 Moore .................. B27B 17/083 83/DIG. 1
4,381,037 A * 4/1983 Cuneo ..................... B23B 45/02 200/321
5,588,495 A * 12/1996 Dear ....................... B25F 5/021 173/171
5,607,266 A * 3/1997 Anderson ........... B23B 51/0473 408/124
5,724,737 A * 3/1998 Stones ................ B27B 17/0008 200/321
6,293,859 B1 * 9/2001 Fink .......................... B25F 5/02 451/344
7,628,219 B2 * 12/2009 Frauhammer ............. B25F 5/00 173/29
7,788,962 B2 * 9/2010 Chiasson ................ B25F 5/005 30/180
2009/0107297 A1 * 4/2009 Junkers ................. B25B 21/008 81/57.39
2011/0025207 A1 * 2/2011 Nagasaka ............... B25B 23/18 315/76
2011/0056996 A1 * 3/2011 Schneider .............. B23D 51/01 222/391
2012/0048585 A1 * 3/2012 Miyazawa .............. B25F 5/029 173/170
2013/0020105 A1 * 1/2013 Cook .................... B23B 45/001 173/170
2013/0160304 A1 * 6/2013 Tate .................... B27B 17/0008 30/277.4
2013/0162188 A1 * 6/2013 Koeder ................... B25F 5/026 318/434
2013/0213679 A1 8/2013 Miyazawa et al.
2014/0304973 A1 * 10/2014 Guthrie ..................... B25F 3/00 29/525.11
2017/0259446 A1 * 9/2017 Skinner .................. B26D 5/086
2019/0321960 A1 10/2019 Czirjak et al.
2021/0060756 A1 * 3/2021 Turner ................... H01H 21/54

FOREIGN PATENT DOCUMENTS

EP 0750837 A1 1/1997
EP 1787507 A2 5/2007
EP 2422934 A1 2/2012

OTHER PUBLICATIONS

International Search Report (ISR) dated Aug. 27, 2020, issued in International Application No. PCT/EP2020/061290.
Written Opinion dated Aug. 27, 2020 issued in International Application No. PCT/EP2020/061290.

* cited by examiner

HANDHELD POWER TOOL

TECHNICAL FIELD

The present invention generally relates to hand held power tools, more particularly to such power tools comprising switches and configured to control a supply of energy to the motor based on operation of these switches.

TECHNICAL BACKGROUND

Hand held power tools for tightening are known to be used in various industries, where the size of the screws used varies from very large to very small. Where very large screws are commonly utilized, these also commonly need to be tightened to very high torque levels. The tools used in such fields therefore as such tend to be large and heavy and thus impose considerable strain on an operator handling the tool thus placing high demands on the ergonomics of the tool. Further, in order to provide the high torque levels needed, heavy so called front gear units (also known as torque multipliers) are commonly used, making the weight distribution of such tools shifted towards the front end of the tool and thus making the tool even less ergonomic for the user. Depending on the application, such screws may further be situated in hard to reach position, this being yet another factor negatively influencing the strain on the operator.

One known way of improving the ergonomic situation is that the operator supports the tool at a front end by holding the front gear unit. However, given the high torques delivered by such tools, this is associated with a considerable safety hazard. For example, since for the discussed high torque levels the use of reaction arms is common, the hand of the operator risk getting squeezed or pinched between the reaction arm and joint and/or work piece.

In order to alleviate some of these problems, attempts have been made to use one or more handles two provide a two-hand grip. However, there are still problems remaining in that that operators not always handle the tool an intended and might not use the handles provided and may thus still be subjected to both a less ergonomic situations and a squeezing hazard, and further in that the introduction of handles as such make the tool more complex and bulky. Hence there exists a need for improvement in the field of such hand held power tools.

SUMMARY OF THE INVENTION

Accordingly, it would be desirable to provide a design enabling a more ergonomic handling of the tool imposing less strain on the operator of the tool. In particular, it would be desirable to provide such a design which also improves safety at the worksite and which does not add unnecessary complexity and bulkiness to the tool. To better address one or more of these concerns a hand held power tool as defined in the independent claim is provided. Preferred embodiments are defined in the dependent claims.

According to a first aspect of the invention a hand held power tool is provided, the power tool comprising a housing in which a motor coupled to an outgoing axle defining an axial direction is arranged, a front gear unit attached to the housing at a front end thereof, a first handle portion, and a second supporting handle structure arranged at the front end of the housing and extending in a direction parallel to the axial direction in order to allow a user to support the tool at the front gear. The tool further comprising a first switch arranged at the first handle and configured to control a supply of energy to the motor, and a second switch configured to control a supply of energy to the motor, wherein the hand held power tool is operative to require the user of the power tool to simultaneously operate the first switch and the second switch in order for energy to be supplied to the motor, and wherein the second switch is arranged at the second supporting handle structure.

According to the first aspect, the handheld power tool provides an inventive solution to the concerns described above by means of a design incorporating a second handle structure not only allowing a user to in an ergonomically manner support the tool at the commonly heavy front gear unit but also at which second handle a second switch is arranged such that energy is only supplied to the motor when the user holds the tool both at the first, or primary handle, and also supports the tool at the front gear (i.e. at the second supporting structure).

The power tool according to the invention therefore cleverly provides improved ergonomics as well as improved safety by means of the provision of one inventive structure, i.e. the inventive second handle structure, thus also reducing complexity and bulkiness of the tool. This since as the operator is forced to keep his or her second hand at the second support handle in order for energy to be supplied to the motor, an ergonomic working position is automatically achieved at all times and hence, the inventive design of the power tool according to independent claim 1 cleverly solves both the problem lack of ergonomics and lack of safety, this in a manner reducing complexity and bulkiness of the tool.

The referenced hand held power tool may for example be a pistol nut runner, for example an electric pistol nut runner. The hand held tool may in some embodiments be a transducerized tool. Further, the tool may depending on the application further comprise a suitable reaction arm for example a swiveling reaction bar. In one embodiment, this reaction arm may be arranged at the front end of the front gear, and the second supporting handle may be arranged between the first handle and the attachment of reaction bar. The front gear unit may be a swiveling front gear unit.

Further, according to one embodiment, the hand held power tool comprises circuitry for controlling the tool. For example, such circuitry may comprise a processor and a memory containing instructions executable by the processor, which when run in the hand held power tool causes the tool to require the user of the power tool to simultaneously operate the first switch and the second switch in order for energy to be supplied to the motor. According to one embodiment, the second switch is comprised by, i.e. forms part of, the second supporting handle structure. Such a switch may for example constitute a portion of the surface of the second supporting handle.

According to one embodiment, the second handle structure is releasably arranged at said front end of said housing. This allows for easy assembly and disassembly and thus adaption of the tool to different application.

According to one embodiment, the second handle structure is rotatably arranged at said front end of said housing. Hereby, the user may position the second handle structure at a suitable circumferential position to support the tool under the front gear unit regardless of the orientation of the tool.

I.e. at a position under, i.e. below, the front gear unit in the direction in which the force of gravity acts on the tool.

According to one embodiment, the second handle structure is arranged to extend in a direction parallel to the outgoing axle at a circumferential position with respect to the front gear which allows a user to vertically support the tool under the front gear. Such a circumferential position may be a position referred to, in use, as a position on an underside of the front gear unit. For example, in such an embodiment, a user may hold the tool using one hand to grip the first handle portion, and one hand conveniently supporting the tool under the front gear. As above, by the term under should hence be understood a position under the front gear unit in the direction in which the force of gravity acts on the tool.

According to one embodiment, the second handle structure is arranged at an axial position coinciding with the axial position of the center of gravity of the tool. Hereby, ergonomics and handling of tool is greatly improved as the tool may be supported properly in a balanced manner.

According to one embodiment, the first handle portion is arranged to extend from the housing at the circumferential position. I.e., the first handle portion and the second supporting structure may in some embodiments be arranged at the same circumferential position. According to one embodiment, the tool may be a so called pistol type tool and the first handle may be described as a pistol handle extending at the specified circumferential position in what may, in use, be described as a position under or on an underside of the front gear. In such an embodiment, a user may hold the tool using one hand to grip the pistol handle, and one hand conveniently supporting the tool under the front gear. According to one embodiment, the first handle portion is arranged to extend in a direction substantially perpendicular to the outgoing axle. Such a design could also be referred to as a type of pistol tool design.

According to one embodiment, the second supporting handle structure comprises an elongated gripping portion adapted to support a hand of an operator and a trigger arranged on the elongated gripping portion. Hereby, ergonomic handling of the tool is facilitated. In one embodiment, the gripping portion may be made of a material further increasing usability, such as rubber. According to one embodiment, the elongated gripping portion adapted to support a hand of an operator comprises a rounded outer surface adapted to fit a palm of a hand of an operator. Such a shape increases ergonomics for the user even further.

According to one embodiment, the elongated gripping portion extends in a circumferential direction over less than half of the circumference of said front gear. The gripping portion may for example be made to extend just enough to fit the palm of the user, not more. For example, the supporting second handle structure as such may be made to extend in a circumferential direction just as much as needed to provide a comfortable grip for the user, not more. Hereby, i.e. by keeping dimensions of the handle small, the weight of the handle may be reduced and the overall design of the tool made slimmer.

According to one embodiment, the second supporting handle structure further comprises an attachment ring for attaching the handle structure to the housing. A ring shape is suitable for attachment to a substantially cylindrical portion of the housing. The skilled person however realizes that any other shape may be conceivable for an attachment structure, depending on the design of the housing. Further, the handle may in some embodiment instead be attached to the front gear unit. According to one embodiment, the attachment ring is adapted to fit between the housing and the front gear.

According to one embodiment, the hand held power tool is operative to interrupt the supply of energy to the motor if at least one of the first and second switch is released. For example, according to one embodiment, the hand held power tool is operative to interrupt the supply of energy to the motor if the second switch is released. In some embodiments, the tool may further be operable to interrupt the supply of energy to the motor if at least one of the first and second switch is subjected to a pressure below a certain threshold limit. In other embodiments, the tool may be operable to interrupt the supply of energy to the motor if at least one of the first and second switch is/are operated and/or released within a certain predetermined time.

According to one embodiment, the hand held power tool is configured to deliver a torque in the range 200-5000 Nm. The advantages of the inventive second handle structure design are of particular importance as the torque delivered, and hence the size of the front gear unit and the potential risks involved, increases.

According to one embodiment, the first handle portion is integrally formed with said housing. In one embodiment, the first handle is further arranged at a rear end of said housing. In other embodiments, the first handle portion is arranged between the front end and rear end of the housing, for example in the middle of the housing between these ends. These arrangement may for example be the case for the pistol type tools mentioned above, for example piston type nut runners.

According to one embodiment, the tool is a battery powered tool, i.e. a tool further comprising a battery.

According to a second aspect of the present invention, a supporting handle for use with a power tool according to any of the embodiments described in the foregoing is provided. Objectives, advantages and features conceivable within the scope of the second aspect of the invention are readily understood by the foregoing discussion referring to the first aspect of the invention.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWING

The invention will be described in the following illustrative and non-limiting detailed description of exemplary embodiments, with reference to the appended drawing, on which

All figures are schematic, not necessarily to scale and generally only show parts which are necessary in order to elucidate the invention, wherein other parts may be omitted or merely suggested.

DETAILED DESCRIPTION

Figure 1:
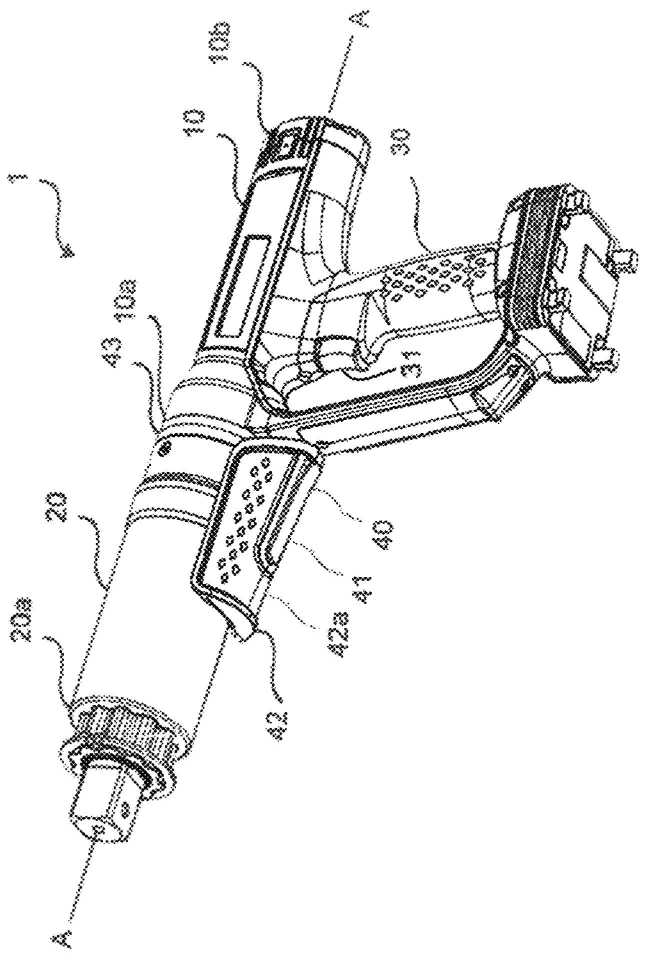
FIG. 1 is a perspective view of an exemplary hand held power tool according to one embodiment.

An exemplary hand held power tool 1 is shown in perspective view in FIG. 1, the illustrated embodiment being a battery powered pistol type nut runner comprising a housing 10 in which a motor (not shown) coupled to an outgoing axle defining an axial direction A-A is arranged. A front gear unit 20 is attached to the housing at a front end 10*a* of the housing. Further, a reaction arm may be arranged at a front end 20*a* of the gear unit.

At a position between the front end 10*a* and a rear end 10*b* of the housing a first handle portion 30 in the form of a pistol handle 30 is arranged and extends in a perpendicular, or at least almost or substantially perpendicular direction, to the an upper portion of the housing 10 and also to the axle A-A. In the illustrated embodiment, the first handle portion is a handle 30 integrally formed with the housing 10. A battery (not shown) is arranged below the first handle 30.

Figure 2B:
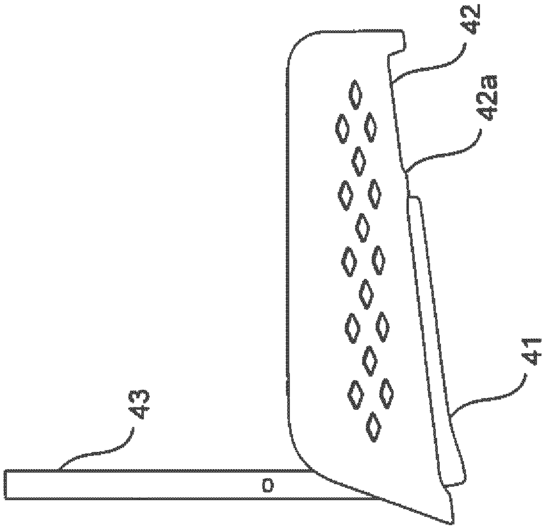
FIG. 2*b* is a side view of a second supporting handle structure according to one embodiment.

A second supporting handle structure 40 is arranged at the front end 10*a* of the housing 10 and extends in a direction parallel to the direction of the axis A-A, and hence allows a user to support the tool 1 not only at the handle 30 but also at the front gear 20. In the illustrated embodiment, the second handle structure 40 is rotatably and releasably arranged at the front end 10*a* of the housing 10. This functionality is provided by an attachment ring 43 attaching the second handle structure 40 to the housing, more particularly the ring 43 is adapted to fit between the housing and the front gear. The ring is also shown in greater detail in FIGS. 2*a* and 2*b*.

The second handle 40 is arranged to extend in a direction parallel to the axle A-A and illustrated at a circumferential position with respect to the front gear unit 20 which allows a user to vertically support said tool 1 under said front gear 20 when positioned in a common working position. In the illustrated embodiment, this circumferential position may be described as a position under the front gear unit 20. Further, the second handle structure is arranged at an axial position coinciding approximately the axial position of the center of gravity of the tool. In the illustrated embodiment, the piston handle 30 is also arranged to extend at approximately the same circumferential position, i.e. both the handles 30, 40 support the tool 1 on a same side.

Figure 2A:
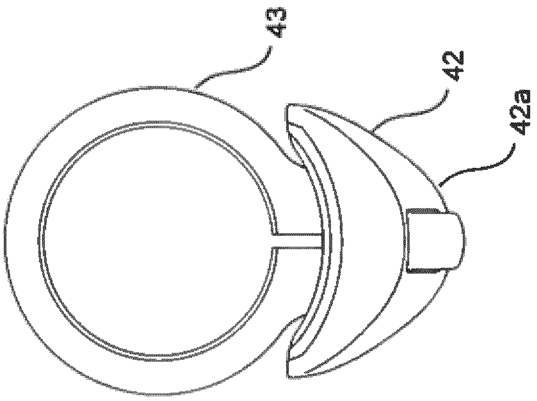
FIG. 2*a* is a front view of a second supporting handle structure according to one embodiment.

In order to provide a comfortable fit for the hand of the operator, the second supporting handle structure 40 comprises an elongated gripping portion 42 adapted to support the hand having a rounded outer surface 42*a* adapted to fit the palm of the hand. This elongated gripping portion 42*a* as shown In FIG. 2*a* extends in a circumferential direction over an angle α, in the illustrated embodiment extending over less than a quarter of the circumference of the ring 43 (i.e. or of the front gear 20). All of these features are shown in detail in FIGS. 2*a* and *b*.

In order to control the energy supply to the motor, the tool 1 further comprises a first switch 31 in the form of a trigger 31 arranged at the first handle 30 and configured to control the supply of energy to the motor, and a second switch 41 also configured to control a supply of energy to the motor, herein the form of a trigger 41 arranged on the elongated gripping portion 42, the trigger 41 also having a somewhat elongated shape (see FIG. 2*a*). Based on the operation of theses triggers 31, 41 by the user, the hand held power tool 1 is operative to require the user of the power tool 1 to simultaneously operate the first switch 31 and the second switch 41 in order for energy to be supplied to the motor. Hereby, accidents involving pinching or squeezing of the hand of the operator by the reaction arm may be avoided in that the front hand of the user supporting the tool 1 and the front end must be safely positioned at the second handle 40 in order for the motor to start. Further, the illustrated hand held power tool 1 is operative to interrupt the supply of energy to the motor if at least one of the first and second switch 31, 41 is released. For example, the supply of energy to the motor may be interrupted if one of the triggers 31, 41 is released. As an additional advantage during operation of the tool 1, as the operator is forced to keep his or her second hand at the second support handle 40 in order for energy to be supplied to the motor, an ergonomic working position is automatically achieved at all times and hence, both ergonomics and safety are simultaneously improved.

While the invention has been illustrated and described in detail in the drawings and foregoing description, such illustration and description are to be considered illustrative or exemplary and not restrictive; the invention is not limited to the disclosed embodiment. The skilled person understands that many modifications, variations and alterations are conceivable within the scope as defined in the appended claims. Additionally, variations to the disclosed embodiments can be understood and effected by those skilled in the art in practicing the claimed invention, form a study of the drawings, the disclosure and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A handheld power tool for tightening comprising:
- a housing in which a motor coupled to an outgoing axle defining an axial direction is arranged;
- a torque multiplier attached to the housing at a front end thereof;
- a first handle portion;
- a second supporting handle structure attached at a position between the torque multiplier and the front end of the housing, and extending along the torque multiplier in a direction parallel to the axial direction from the position where the second supporting handle structure is attached, to allow a user to vertically support the handheld power tool at the torque multiplier from underneath the torque multiplier;
- a first switch arranged at the first handle and configured to control a supply of energy to the motor, and
- a second switch configured to control the supply of energy to the motor,
- wherein the handheld power tool is configured to require the user of the handheld power tool to simultaneously operate the first switch and the second switch in order for energy to be supplied to the motor, and
- wherein the second switch is arranged at the second supporting handle structure.

2. The handheld power tool according to claim 1, wherein the second supporting handle structure is releasably arranged at the front end of the housing.

3. The handheld power tool according to claim 1, wherein the second supporting handle structure is rotatably arranged at the front end of the housing.

4. The handheld power tool according to claim 1, wherein the second supporting handle structure is arranged at an axial position coinciding with an axial position of a center of gravity of the handheld power tool.

5. The handheld power tool according to claim 1, wherein the first handle portion is arranged to extend at a circumferential position.

6. The handheld power tool according to claim 1, wherein the first handle portion is arranged to extend in a direction substantially perpendicular to the outgoing axle.

7. The handheld power tool according to claim 1, wherein the second supporting handle structure comprises an elongated gripping portion adapted to support a hand of the user and a trigger arranged on the elongated gripping portion.

8. The handheld power tool according to claim 7, wherein the elongated gripping portion adapted to support the hand of the user comprises a rounded outer surface adapted to fit a palm of the hand of the user.

9. The handheld power tool according to claim 7, wherein the elongated gripping portion further extends in a circumferential direction over less than half of a circumference of the torque multiplier.

10. The handheld power tool according to claim 1, wherein the second supporting handle structure further comprises an attachment ring for attaching the second supporting handle structure to the housing.

11. The handheld power tool according to claim 10, wherein the attachment ring is adapted to fit between the housing and the torque multiplier.

12. The handheld power tool according to claim 1, wherein the handheld power tool is configured to interrupt the supply of energy to the motor if at least one of the first and second switches is released.

13. The handheld power tool according to claim 1, wherein the first handle portion is integrally formed with the housing.

14. The handheld power tool according to claim 1, wherein the handheld power tool is a battery powered tool further comprising a battery.

* * * * *